(12) United States Patent
Wang

(10) Patent No.: US 8,701,038 B2
(45) Date of Patent: Apr. 15, 2014

(54) METHOD FOR DISPLAYING PROGRAM EXECUTION WINDOW BASED ON USER'S LOCATION AND COMPUTER SYSTEM EMPLOYING THE METHOD

(75) Inventor: Huai-Cheng Wang, Jhongli (TW)

(73) Assignee: Getac Technology Corporation, Hsinchu County (TW)

( * ) Notice: Subject to any disclaimer, the term of this patent is extended or adjusted under 35 U.S.C. 154(b) by 1141 days.

(21) Appl. No.: 12/155,656

(22) Filed: Jun. 9, 2008

(65) Prior Publication Data
US 2009/0164938 A1 Jun. 25, 2009

(30) Foreign Application Priority Data
Dec. 19, 2007 (CN) .......................... 2007 1 0300547

(51) Int. Cl.
*G06F 3/048* (2013.01)

(52) U.S. Cl.
CPC ...................................... *G06F 3/048* (2013.01)
USPC ........................................................ 715/810

(58) Field of Classification Search
CPC ................................. G06F 3/048; A63F 13/12
USPC .................................................. 715/810, 803
See application file for complete search history.

(56) References Cited

U.S. PATENT DOCUMENTS

| 2003/0018522 A1* | 1/2003 | Denimarck et al. | ............ 705/14 |
| 2005/0180605 A1* | 8/2005 | Toyama | ........................ 382/103 |
| 2006/0214911 A1* | 9/2006 | Miller | ............................ 345/157 |

FOREIGN PATENT DOCUMENTS

WO WO 9939328 A1 * 8/1999 ............... G09G 5/00

* cited by examiner

*Primary Examiner* — Sara England
*Assistant Examiner* — Angie Badawi

(57) ABSTRACT

Disclosed are a method for displaying a program execution window based on a user's location and a computer system that embodies the method, wherein a window of a selected and executed program is displayed on a selected local zone of a displaying screen. The computer system includes a microprocessor, a system memory, and a program storage device storing therein a program-window-displayed-location control program and application programs that can be selected and executed by a user. When the microprocessor executes the control program, the control program detects if any one of the application programs is selected by the user and uses a user location identification device to determine which one of a plurality of local zones that constitute the displaying screen that the user is located on. Then, a window of the execution of the selected application programs is displayed on the one of the local zones of the displaying screen.

14 Claims, 3 Drawing Sheets

METHOD FOR DISPLAYING PROGRAM EXECUTION WINDOW BASED ON USER'S LOCATION AND COMPUTER SYSTEM EMPLOYING THE METHOD

FIELD OF THE INVENTION

The present invention relates to displaying of the window for the execution of a program, and in particular to a method for displaying a program execution window based on a user's location and a computer system employing the method.

BACKGROUND OF THE INVENTION

A personal computer comprises a display and a conventional computer display is now switched from a cathode ray tube based device to a liquid crystal display (LCD). Furthermore, for comfortableness of a user's viewing the computer display, the computer display is now replaced by a wide screen display and the display area is getting larger.

It is also known to combine a plurality of display devices to form a combined display that has a large display area for special purposes such as enhancing effect of advertisement or to provide a user with more reality of viewing effect. However, most of the combined display device that is formed by combining a plurality of individual displays has a very large size display area, which often exceeds the viewing angle of a user, so that the user cannot completely read displayed information or message at a single glance of the display area and the control and operation become very awkward.

Heretofore, various techniques of control and operation in the related field were available. An example is illustrated in Taiwan Patent Publication No. 200701055, which discloses a voice-controlled multimedia playing device and the voice control method thereof. In this Taiwan Patent, the multimedia playing device comprises a voice control mode activation switch, a voice detection module, a voice control processing module, an audio instruction playing module, an audio database, and a multimedia data playing/processing module.

A user uses the voice control mode activation switch to start a voice control operation mode. After the voice control operation mode is activated, the voice detection module detects and analyzes a voice signal from the surroundings via the voice control processing module. The voice control processing module determines a program instruction corresponding to the voice signal and executes an operation processing routine in accordance with the program instruction.

The audio instruction playing module plays audio data in accordance with the program instruction in order to prompt the user to provide corresponding voice signal. The audio database stores multiple audio data sets corresponding to the program instruction. The multimedia data playing/processing module may base on the files that are of multimedia data formats in the operation processing routine to execute playing operation of the multimedia file data.

Further, Taiwan Utility Model No. 200703140 discloses a video processing method for automatically adjusting the location of window interface and the device thereof, which is used in association with a video system. The video system comprises an image pickup device and a display device. The image pickup device functions to obtain an image signal containing data of a human face and display the image signal in a window interface of the display device. Based on analysis performed on the human face data, the location of face characteristic is determined and a location parameter that is subjected to adjustment is figured out. Then, the location parameter is used to adjust the location of the window interface to have a human face carried by the image signal displayed to exactly confront the user.

SUMMARY OF THE INVENTION

Although the prior art techniques can employ voices to realize control of the operation of a multimedia playing device or can employ a video system to automatically set the location of a window interface to confront a user, yet they do not address the inconvenience that an over-sized displaying screen formed by a combination of multiple displays remarkably exceeds the viewing angle of a user. To overcome the inconvenience, the present invention provides a technique that bases on the location of a user relative to the combined displaying screen to determine on which area of the combined screen where a program that the user attempts to load and execute is displayed.

Thus, an objective of the present invention is to provide a method for displaying a program execution window based on a user's location in order to overcome the inconvenience caused by a combined displaying screen substantially exceeding a viewing angle of the user.

Another objective of the present invention is to provide a computer system that displays a program execution window based on a user's location, wherein the computer system controls a displaying screen that comprises a user location identification device to effect location shifting of the program execution window on the displaying screen in accordance with the location of the user.

In accordance with the present invention, a solution to the above programs resides in that when the operation system of a computer is activated, a user is allowed to determine if to activate a control program (which will be referred to as program-window-displayed-location control program) that controls the location on which a window that displays the execution of programs is shown on a displaying screen.

To determine or identify the location of a user with respect to the displaying screen, a user location identification device, which is connected to the computer system, is provided at each of multiple selected, suitable locations above the displaying screen. The user location identification device comprises an image pickup device and a voice detection device.

The image pickup device, which can be for example a web camera, functions to pick up an image of a user and identify a facial characteristic or a characteristic hand gesture to determine which one of multiple divided zones that constitute the displaying screen the location of the user corresponds to. There may be a number of image pickup devices used and the number is determined in accordance with, preferably in proportion to, the spatial range within which the user may move.

The voice detection device, which can be for example a microphone, is either externally connected to or built at multiple locations on the displaying screen to detect the locations where voices from the user are given off to thereby determine the location and orientation of the user. The location where the user's sound or voice is given off is compared with the location of the displaying screen to determine which one of the multiple divided zones that constitute the displaying screen the location of the user corresponds to.

The displaying screen functions to show one or more execution windows for one or more programs loaded in a microprocessor operational memory of a computer system. When a user of the computer system selects to activate and execute the program-window-displayed-location control program, the control programs detects if any program is selected from the program storage device and executed and also determines the one zone among the multiple divided zones of the displaying screen to which the user corresponds by means of the user location identification device.

Then, based on the user's location identified by the user location identification device, the execution window of the selected program that is loaded and executed is shown on the zone of the displaying screen to which the user's location corresponds.

The solution proposed by the present invention alleviates the inconvenience of use and the associated drawbacks caused by the fact that a user is not able to completely read or view an execution window of a loaded and executed program that is shown, in a fully-occupying manner, in a large-sized, multiple-zoned displaying screen of a computer system by employing a method that allows the computer system to control one or more user location identification devices arranged on the displaying screen for identifying the location of the user, based on which the execution window of the executed program is shown on one of the displaying zone associated with the location of the user.

Basing on the user's location to show the execution window of the loaded program on a selected zone of the displaying screen can eliminate the need for operation of a computer mouse to move the execution window to the desired zone. Besides opening and showing the execution window of the loaded program on a user-location-corresponded zone of the displaying screen, the present invention can also be employed to move an already-opened program execution window from a current zone to a next zone of the displaying screen following the movement of the user, which change the user's location to a new site that corresponds to said next zone of the displaying screen whereby instantaneous location shifting of the displayed window can be realized on the displaying screen that is composed of multiple individual display units, serving as the divided displaying zones of the combined displaying screen.

BRIEF DESCRIPTION OF THE DRAWINGS

The present invention will be apparent to those skilled in the art by reading the following description of a preferred embodiment thereof and the best mode for carrying out the present invention, with reference to the attached drawings, in which.

DETAILED DESCRIPTION OF THE PREFERRED EMBODIMENTS

Figure 1:
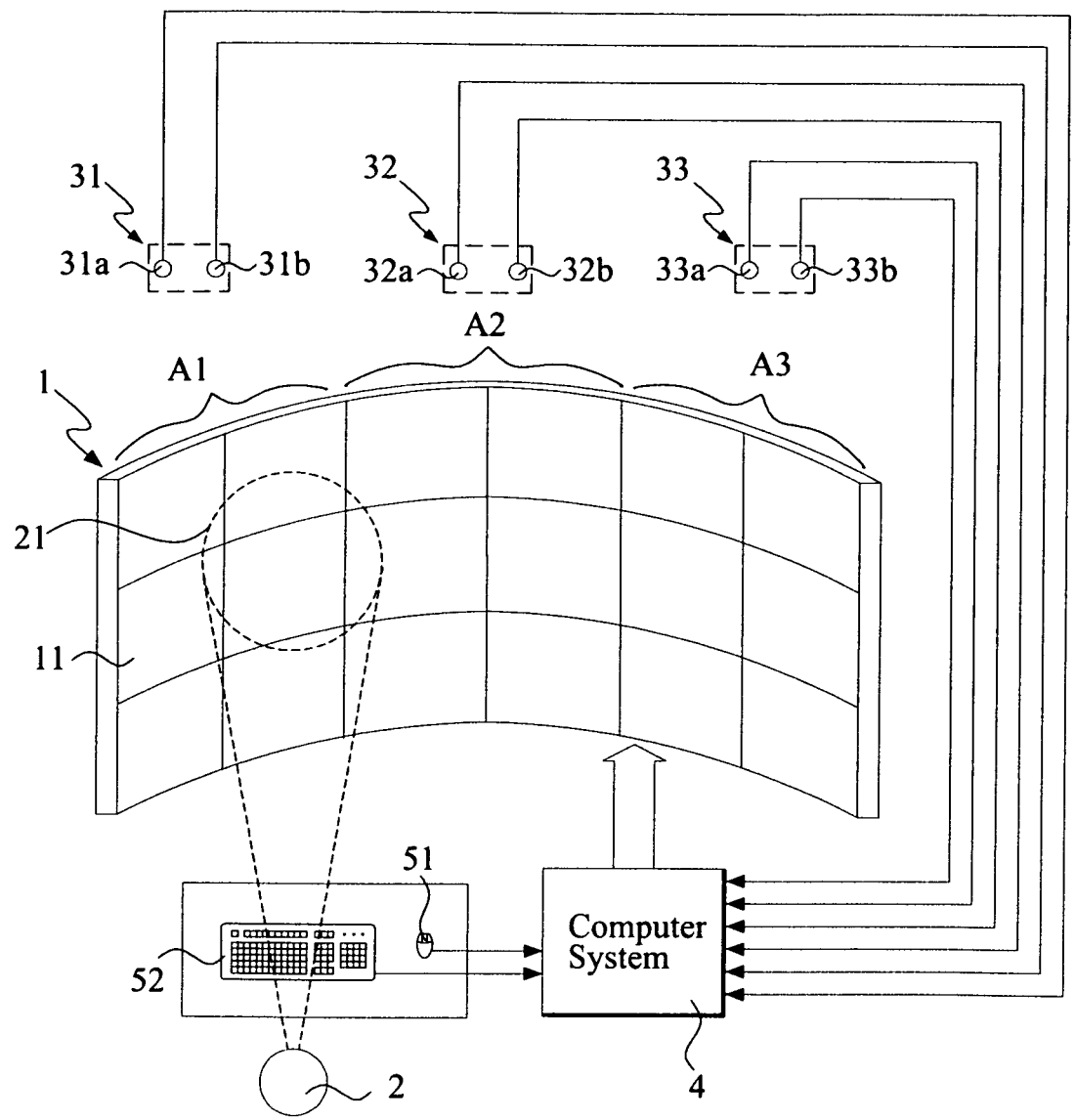
FIG. 1 schematically illustrates a computer system that displays an execution window of a program on a local zone of a combined multiple-zoned displaying screen based on the location of a computer user in accordance with the present invention.

With reference to the drawings and in particular to FIG. 1, which schematically illustrates a computer system that displays an execution window of a program on a local zone of a combined, multiple-zoned displaying screen based on the location of a computer user in accordance with the present invention, the execution program window is shown on a local zone of a large-sized displaying screen 1 that is composed of a plurality of individual display units 11. The displaying area of the screen 1 is divided into a plurality of divided zones A1, A2, A3 that are of sizes corresponding to a viewing angle or range 21 of a user 2.

To determine which one of the divided zones A1, A2, A3 of the displaying screen 1 the location of the user 2 corresponds to, a number of user location identification devices 31, 32, 33 are arranged at suitable locations above the displaying screen 1. The user location identification devices 31, 32, 33 are connected to a computer system 4 and each comprises an image pickup device 31a, 32a, 33a and a voice detection device 31b, 32b, 33b.

The image pickup device 31a, 32a, 33a functions to pick up an image of the user 2 located with respect to the displaying screen 1, and based on the image picked up, the location of the user 2 is associated with one of the divided zones A1, A2, A3 of the displaying screen 1. Correspondence of the location of the user 2 to the one of the divided zones A1, A2, A3 is thus established.

The voice detection device 31b, 32b, 33b functions to detect the correspondence between where voices from the user 2 are given off and the location of the displaying screen 1 to further determine on which divided zones A1, A2, A3 that the user 2 is located.

When the user operates a computer mouse 51 and a keyboard 52 that are connected to the computer system to select and activate execution of a program, the user location identification devices 31, 32, 33 determines the location of the user 2 corresponding to which divided zone A1, A2, A3 of the displaying screen 1 via the image pickup devices 31a, 32a, 33a and the voice detection devices 31b, 32b, 33b and then displays an execution window of the selected program on the zone A1, A2, A3 in which the user 2 is located.

Figure 2:
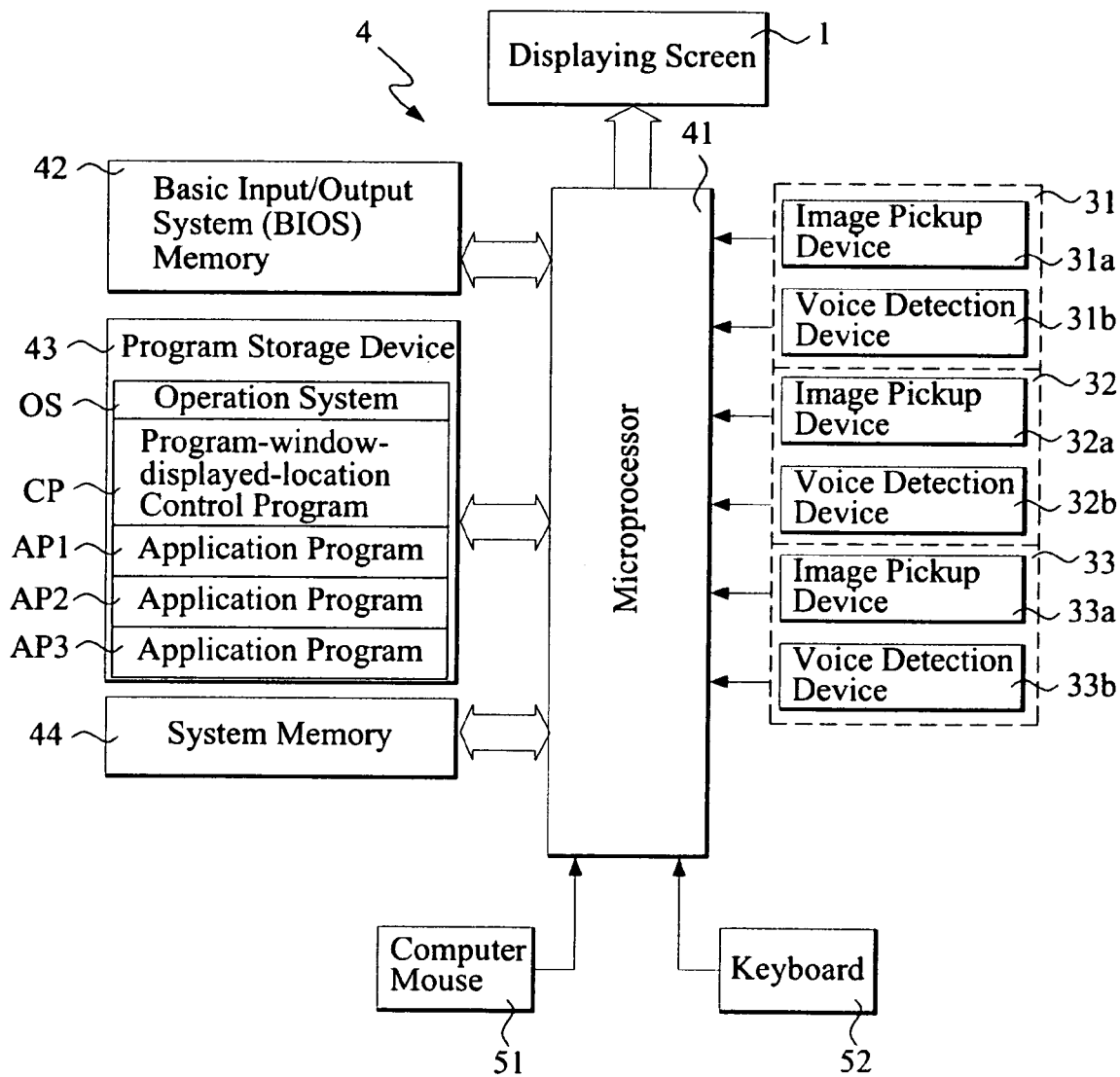
FIG. 2 illustrates a control circuit of the computers system illustrated in FIG. 1.

FIG. 2 illustrates a control circuit of the computer system 4. The computer system 4 is connected to the displaying screen 1, the user location identification devices 31, 32, 33, the computer mouse 51, and the keyboard 52 and comprises a microprocessor 41, a basic input/output system (BIOS) memory 42, a program storage device 43, and a system memory 44.

The displaying screen 1 is capable to display an execution window that the microprocessor 41 processes/executes a selected one of the programs loaded or stored in the BIOS memory 42 and the program storage device 43. The program storage device 43 stores an operation system (OS), a control program (CP) for controlling the displayed location of a program execution for an executed program (which will be referred to as program-window-displayed-location control program), and application programs AP1, AP2, AP3. By means of input signals provided by the user location identification devices 31, 32, 33, the program-window-displayed-location control program CP is provided with location associated data for the location of the user 2. By means of operating the computer mouse 51 and the keyboard 52, the user 2 is allowed to select and execute any one of the application programs AP1, AP2, AP3 that he or she wishes to execute. The microprocessor 41 then loads the program(s) selected by the user 2 from the program storage device 43 into the system memory 44 for execution.

Figure 3:
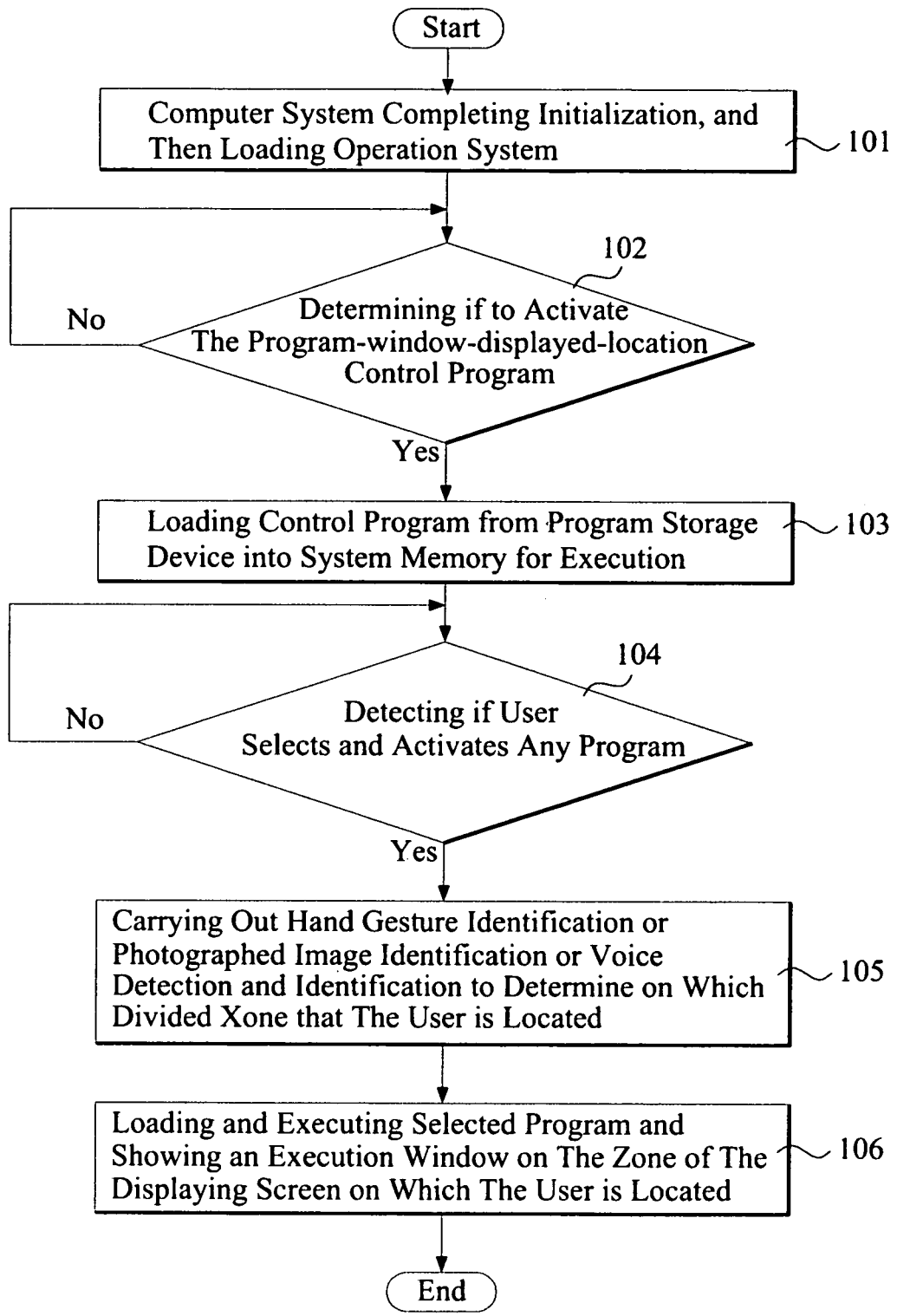
FIG. 3 shows a flow chart of the method for displaying a program execution window based on a user's location on a multiple-zoned screen in accordance with the present invention.

Referring to FIG. 3, a flow chart for the operation of displaying a program execution window based on a user's location on a multiple-zoned screen in accordance with the present invention is shown. When the computer system is started up, the computer system executes basic input/output system (BIOS) that is loaded in the BIOS memory to complete initialization of the computer system and then the operation system stored in the program storage device is loaded (step 101). Once the operation system is activated, the user may determine if to activate the program-window-displayed-location control program (step 102). If the determination of the user is negative, then the control program is not activated; and if the user selects to start the control program, then the control program is loaded from the program storage device into the system memory for execution (step 103).

After the control program is executed, the control program starts to detect if the user selects and activates any program (step 104). Thereafter, the user location identification device, such as an image pickup device that carries out hand gesture identification or photographed image identification and a voice detection device that carries out voice detection and identification, which is connected to the computer system, is employed to determine on which divided zone that the user is located (step 105). In accordance with the user's location identified by the user location identification device, the selected program is loaded and executed and an execution window of the selected and executed program is shown on the zone of the displaying screen on which the user is located (step 106).

Although the present invention has been described with reference to the preferred embodiment thereof, as well as the best mode for carrying out the present invention, it is apparent to those skilled in the art that a variety of modifications and changes may be made without departing from the scope of the present invention which is intended to be defined by the appended claims.

What is claimed is:

1. A method for displaying a program execution window based on a users location by a computer system comprising a microprocessor, a system memory, a displaying screen in which a plurality of local zones extending from a top to a bottom of the displaying screen are defined along a horizontal axis, a program storage device, in which the program storage device contains a program-window-displayed-location control program, and at least one executable application program, the method comprising the following steps:
   (a) starting up the computer system and completing initialization of the computer system and activation of an operation system of the computer system;
   (b) the microprocessor loading the control program from the program storage device into the system memory and executing the control program;
   (c) detecting when the application program is activated;
   (d) identifying which one of the plurality of local zones of the displaying screen before which the user is located along the horizontal axis when the application program is activated;
   (e) executing the application program and displaying an execution window of the application program in the local zone of the displaying screen before which the user is located;
   (f) detecting movement of the user to a different one of the plurality of local zones of the displaying screen; and
   (g) moving the execution window of the application program to the local zone of the displaying screen to which the user has moved.

2. The method as claimed in claim 1, wherein step (a) further comprises a sub-step of determining if the control program is activated.

3. The method as claimed in claim 1, wherein step (c) comprises a sub-step of employing at least one image pickup device that is connected to the computer system to pick up and identify an image of the user corresponding to the local zone on which the user is located.

4. The method as claimed in claim 1, wherein step (d) comprises a sub-step of employing at least one voice detection device that is connected to the computer system to detect a voice given off by the user and determining a corresponding local zone of the displaying screen before which the user is located.

5. A computer system that displays a program execution window based on a users location, comprising:
   a microprocessor;
   a displaying screen in which a plurality of local zones extending from a top to a bottom of the displaying screen are defined along a horizontal axis, wherein the displaying screen is connected to the microprocessor;
   a program storage device, which is connected to the microprocessor and storing a program-window-displayed-location control program and at least one executable application program that is adapted to be selected by the user;
   a system memory, which is connected to the microprocessor, wherein the microprocessor is configured to load the control program from the program storage device into the system memory for execution; and
   at least one user location identification device, which serves to identify which one of the plurality of local zones of the displaying screen before which the user is located along the horizontal axis at the time when the user selects to execute the application program and displays an execution window of the application program in the said one of the plurality of local zones of the displaying screen on which the user is located,
   wherein the program-window-displayed-location control program is further configured to detect movement of the user to a different one of the plurality of local zones of the displaying screen and move the execution window of the application program to the local zone of the displaying screen to which the user has moved.

6. The computer system as claimed in claim 5, wherein the user location identification device comprises at least one image pickup device connected to the computer system to pick up location of an image of the user corresponding to the displaying screen to thereby identify the said one of the plurality of local zones of the displaying screen before which the user is located.

7. The computer system as claimed in claim 5, wherein the user location identification device comprises at least one voice detection device connected to the computer system to detect a location of voice given off by the user and determining a corresponding local zone of the displaying screen before which the user is located.

8. The computer system as claimed in claim 5, wherein the displaying screen comprises a combination of a plurality of individual display units, which together form a large area of displaying screen.

9. A computer system that displays a program execution window based on a users location, comprising:
   a microprocessor;
   a displaying screen in which a plurality of local zones extending from a top to a bottom of the displaying screen are defined along a horizontal axis, wherein the displaying screen is connected to the microprocessor;
   a program storage device, which is connected to the microprocessor and stores a program-window-displayed-location control program and at least one executable application program that is configured to be activated by a user, the application program having an execution window to be displayed on the displaying screen, wherein the execution window is a framed area on the displaying screen for viewing information; and
   at least one user location identification device, configured to identify which one of the plurality of zones of the displaying screen that the user is located before along the horizontal axis at the time when the user activates the application program, and to selectively display the execution window of the application program as a whole in a single one of the plurality zones of the displaying screen on which the user is located, wherein the program-window-displayed-location control program is further configured to detect movement of the user to a different one of the plurality of local zones of the displaying screen and move the execution window of the application program to the local zone of the displaying screen to which the user has moved.

10. The method as claimed in claim 1, wherein the execution window is a framed area on the displaying screen for viewing information.

11. The computer system as claimed in claim 5, wherein the execution window is a framed area on the displaying screen for viewing information.

12. The method as claimed in claim 1, wherein the computer system comprises a plurality of detection devices, each corresponding to a respective one of the plurality of local zones, wherein step (d) comprises receiving input signals from the plurality of detection devices so as to identify which one of the plurality of local zones of the displaying screen before which the user is located.

13. The computer system as claimed in claim 5, comprising a plurality of detection devices, wherein each detection device corresponds to a respective one of the plurality of local zones, configured such that input signals from the plurality of detection devices are used to identify which one of the plurality of local zones of the displaying screen before which the user is located.

14. The computer system as claimed in claim 9, comprising a plurality of detection devices, wherein each detection device corresponds to a respective one of the plurality of local zones, configured such that input signals from the plurality of detection devices are used to identify which one of the plurality of local zones of the displaying screen before which the user is located.

* * * * *